ISAAC R. RITTER. Improvement in Scroll Saws.
No. 120,326. Patented Oct. 24, 1871.
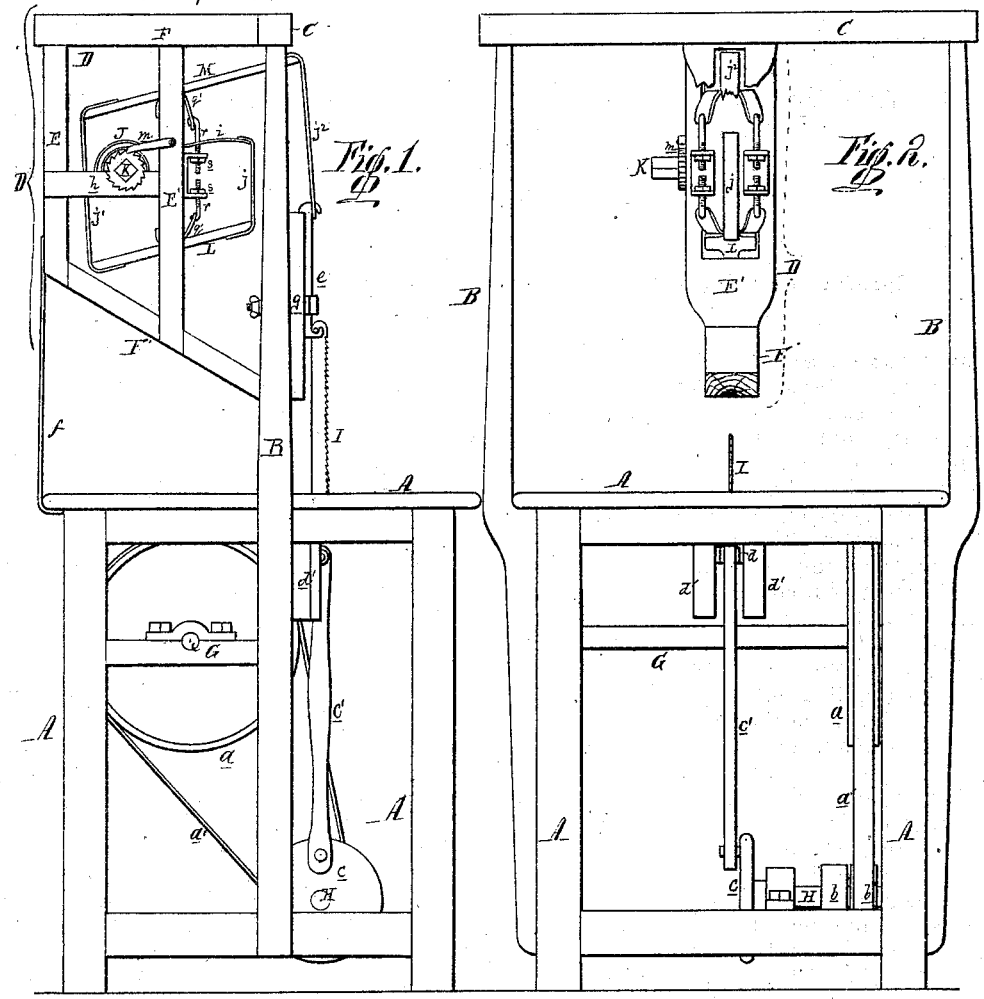
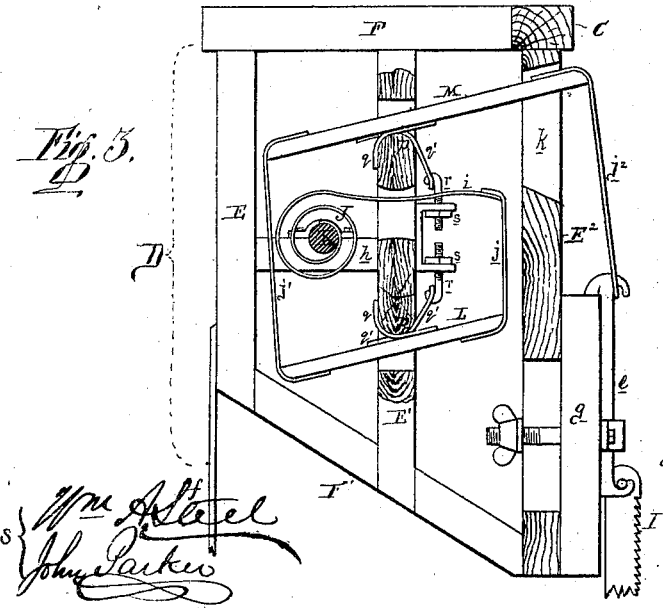
WITNESSES

UNITED STATES PATENT OFFICE.

ISAAC R. RITTER, OF READING, PENNSYLVANIA, ASSIGNOR TO HIMSELF AND JACOB R. RITTER, OF SAME PLACE.

IMPROVEMENT IN SCROLL-SAWS.

Specification forming part of Letters Patent No. 120,326, dated October 24, 1871.

*To all whom it may concern:*

Be it known that I, ISAAC R. RITTER, of Reading, county of Berks, State of Pennsylvania, have invented an Improvement in Scroll-Saws, of which the following is a specification:

My invention consists of certain improvements in gig-saws, too fully explained hereafter to need preliminary explanation, the main object of the said improvements being to enable a proper degree of tension to be imparted to the saw without causing any jerking or jarring of the parts.

Figure 1 is a side elevation of my improved gig-saw; Fig. 2, a front view of the same, partly in section; and Fig. 3, a detached section.

The frame of the machine consists of a table or bench, A, to the sides of which and projecting above the top of the same are secured vertical bars B B, connected together at their upper ends by means of a cross-bar, C. To the latter is hung a frame, D, supported at its rear by a brace, $f$, secured to the top of the work-table. This frame D consists of three vertical bars, E, $E^1$, and $E^2$, connected together at the top by a horizontal bar, F, and at the bottom by an inclined bar, $F'$. The driving-shaft G turns in suitable bearings in the frame A, and has a pulley, $a$, from which motion is transmitted, through a belt, $a'$, to a short spindle, H, running in the lower part of the frame, and furnished with fast and loose pulleys $b$ and $b'$. The spindle H has at one end a crank-wheel, $c$, from which, by means of a connecting-rod, $c'$, a vertical reciprocating movement is imparted to a bar, $d$, adapted to guides $d'$ $d'$ beneath the table A. The lower end of the gig-saw I is attached to and receives its motion from the sliding-bar $d$, and the upper end of the saw is connected to a bar, $e$, which slides in a guide, $g$, secured to and rendered vertically adjustable upon the frame D. The required degree of tension is imparted to the saw by a coiled spring, J, which is attached to and wound upon a short transverse spindle, K, hung to cross-bars H of the frame D. The spring, however, is not attached directly to the saw or to its bar E, but through the medium of two levers, L and M, both hung to the bar $E^1$ of the frame D at points above and below the coiled spring. The projecting end $i$ of the latter is connected to the under lever L by a strap, $j$. The two levers are connected together at the rear of the spring by a strap, $j^1$, and the upper lever extends forward through a slot, $k$, in the frame D, and is connected to the sliding bar $e$ of the saw by a strap, $j^2$. (See Fig. 3.)

I have ascertained by practical tests that, by the use of a coiled spring connected to the saw by means of levers and straps, as above described, a proper and uniform degree of tension can be imparted to the saw, and that the machine will run smoothly and without that disagreeable jerking and jarring which usually occurs when gum, spiral, or other springs are connected directly to the saw.

Another advantage possessed by my invention is that the degree of tension upon the saw can be readily regulated, at the will of the operator, to suit the different thicknesses of the material to be sawed, by means of a pawl and ratchet $m$ at one end of the spring-spindle K, which enables the latter to be turned to any desired extent for the purpose of coiling or uncoiling the spring.

In order that there may be as little friction as possible at the fulcrums of the levers L and M, and so as also to prevent the levers from wearing and working loosely at these points, the said levers are arranged to turn upon rounded portions $p$ of the bar $E^1$, as shown in Fig. 3, and are connected to the said bar by means of crossed straps $q$ and $q'$, which, while firmly retaining the levers, permit them to be turned fully to any desired extent. The ends of the straps $q'$ are connected to short screw-bolts $r$ provided with nuts $s$, by means of which arrangement the said straps can be tightened from time to time so as to prevent any slipping or swaying of the levers.

What I claim as new, and desire to secure by Letters Patent, is—

1. A tension device for gig-saws, consisting of a coiled spring, J, and of levers L and M, the whole being arranged in respect to each other, and connected together and to the saw by means of straps or their equivalents, substantially as herein described.

2. The combination of the saw-frame, the levers connected to and operating the saw, and the coiled spring J, its spindle K, and pawl and ratchet $m$, all arranged and operating as described.

3. The levers L and M hung to the bar $E^1$ by means of straps $j$ and $j^1$, substantially in the manner described.

4. The combination, with the straps $j^1$, of the bolts $r$ and adjusting-nuts $s$, all substantially as and for the purpose specified.

In testimony whereof I have signed my name to this specification in the presence of two subscribing witnesses.

ISAAC R. RITTER.

Witnesses:
 WILLIAM P. BARD,
 HORACE A. TUND, Jr. (130)